United States Patent Office 3,799,944
Patented Mar. 26, 1974

3,799,944
CHLORINE-CONTAINING AROMATIC DIOXINE COMPOUNDS AND PROCESS FOR THE PRODUCTION THEREOF
Gerhard Darsow and Hermann Schnell, Krefeld-Uerdingen, Germany, assignors to Bayer Aktiengesellschaft, Leverkusen, Germany
No Drawing. Filed May 19, 1970, Ser. No. 38,918
Claims priority, application Germany, June 13, 1969, P 19 30 259.1
Int. Cl. C07d 15/18
U.S. Cl. 260—340.3     2 Claims

ABSTRACT OF THE DISCLOSURE

New chlorine-containing aromatic dioxine compounds are provided which are valuable flame-resistant agents for resins such as polyesters and which are the reaction products of hexachlorobenzene or a tetrachlorobenzene with a dialkali metal phenolate.

---

The subject-matter of the invention comprises new chlorine-containing dioxine compounds of the Formulae I and II

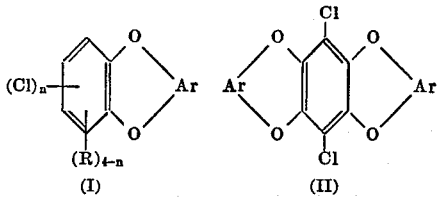

in which Ar denotes an o-phenylene, -naphthylene or -diphenylene radical which may be substituted by alkyl groups or halogen atoms; R means hydrogen or alkyl radicals with 1–4 carbon atoms; and $n$ is equal to 2 or 4.

Examples of such compounds are 1,2-dichloro-dibenzo-p-dioxine, 1,4-dichloro-dibenzo-p-dioxine, 2,3-dichloro-dibenzo-p-dioxine, 2,3-dichloro - 7' - phenyl-dibenzo-p-dioxine, 1,2,3,4-tetrachloro-dibenzo-p-dioxine, 2,3-dichloro-benzo - [5,6]naphtho[2',3']-p-dioxine and 6,13-dichloro-benzo-p-dioxino-[2,3]dibenzo-p-dioxine.

The new chlorine-containing dioxine compounds are colourless crystalline substances which melt at between about 150° and about 350° C. and are soluble in solvents such as dioxan, toluene, dimethyl sulphoxide and dimethyl formamide. They can be added to synthetic materials, e.g. unsaturated and saturated polyesters, for example, in amounts of about 3 to about 15 percent by weight, in order to render these materials difficultly inflammable.

The new dioxine compounds can be prepared according to the invention by reacting 1 mol of a tetrachlorobenzene of the Formula III.

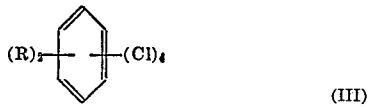

with 1 mol of a dialkali metal phenolate of the Formula IV

in which Me denotes an alkali metal, or by reacting 1 mol hexachlorobenzene with 1 or 2 mol of a dialkali metal phenolate of the Formula IV in a strongly polar organic solvent at temperatures between about 60° and about 160° C., preferably between about 90° and about 150° C.

This reaction does not lead to the formation of linear di- or polyaryl ethers, as one would expect; instead, surprisingly, the new chlorine-containing dioxine compounds according to the invention are formed by ring closure.

Examples of tetrachlorobenzenes of the Formula III are 1,2,4,5-tetrachlorobenzene, 1,2,3,5-tetrachlorobenzene, 1,2,3,4-tetrachlorobenzene and 1,2,4,5-tetrachloro-3,6-dimethylbenzene.

Examples of dialkali metal phenolates of the Formula IV are those of pyrocatechol, 1,2-dihydroxy-naphthalene, 2,3-dihydroxy-naphthalene and 3,4-dihydroxy-diphenyl.

Among the dialkaliphenolates the sodium and potassium salts are preferred.

Examples of suitable strongly polar organic solvents are diethyl sulphoxide, dimethyl-sulphone, diethyl-sulphone and tetramethyl-sulphone, but preferably dimethylsulphoxide.

The dialkali metal salts of the diphenols can be prepared by known methods prior to the reaction proper by reacting the diphenol concerned in an inert organic solvent with the alkali metal, alkali metal alcoholate or alkali metal hydroxide concerned and subsequently distilling off the solvent.

However, it is simpler and more expedient for the subsequent condensation reaction to prepare the dialkali metal phenolates concerned in situ by allowing the salt formation and the ring closure with the polychlorobenzene to proceed simultaneously or successively in the presence of the polar solvent.

For this purpose, 1 mol of the polychlorobenzene and 1 or 2 mol of the diphenol are dissolved in a sufficient amount of the polar solvent, the stoichiometric amount of alkali metal hydroxide is added in solid form or as a concentrated aqueous solution (appr. 50%) and the mixture is gradually heated under an inert gas, for example, nitrogen to the reaction temperature. After cooling, the reaction mixture is mixed with water, whereupon the reaction product is precipitated and can be separated. Any impurities can be removed by rinsing or by recrystallization from a suitable solvent.

If the chlorobenzene is susceptible to sublimation, only the diphenol and the alkali metal hydroxide are initially dissolved in the polar solvent with heating, this mixture is cooled to room temperature and then, after addition of the polychlorobenzene, gradually heated to the reaction temperature while stirring. It is also possible in such a case to work under an inert gas pressure of e.g. 1–2 atmospheres.

In order to achieve high yields and to reduce the reaction time, it may be advantageous to keep the water content of the mixture low during the ring closure of the dialkali metal phenolates with the polychlorobenzene. For this purpose, the diphenol is dissolved in a sufficient amount of the polar solvent, the stoichiometric amount of alkali metal hydroxide is added in solid form or as a concentrated aqueous solution, and the mixture is heated under an inert gas at about 110° to about 150° C. for some time, e.g. 2–6 hours, the water which is present and the water which is liberated in the course of the phenolate formation being substantially distilled off from the reaction mixture, expediently with the use of an entraining agent such as benzene, toluene or xylene. The polychlorobenzene is subsequently added whereupon ring closure is carried out by heating to the aforesaid reaction temperatures.

Another simple method of substantially removing the water from the reaction mixture consists in dissolving the diphenol and the alkali metal hydroxide in a sufficient amount of the polar organic solvent while heating, and subsequently distilling off about 10-20 percent by volume of the polar organic solvent, expediently in a vacuum, before adding the polychlorobenzene. The water is thus distilled off from the reaction mixture azeotropically with the partial amount of polar solvent. The polychlorobenzene is then added, and ring closure sets in when heating is continued.

EXAMPLE 1

2,3-dichloro-dibenzo-p-dioxine

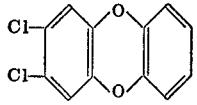

110.1 g. (1 mol) pyrocatechol and 80 g. (2 mol) of solid sodium hydroxide are dissolved under an inert gas (nitrogen) in 500 ml. dimethyl sulphoxide by heating to 70°-80° C. 215.9 g. (1 mol) 1,2,4,5-tetrachlorobenzene are subsequently added at 80° C., and the reaction mixture is heated at 140° C. for 8 hours. After cooling, the reaction product is precipitated in the form of white crystalline slurry by pouring the mixture into water. The reaction product is filtered off, washed until neutral and dried. The resultant product is subsequently purified by distillation in a vacuum. The distillation product is a colorless liquid which immediately solidifies in crystalline form. The yield amounts to 238 g. or 94% of theory. The finely crystalline 2,3-dichloro-dibenzo-p-dioxine melts at 156°-157° C.

| Elementary analysis | C | O | H | Cl | Mol weight |
|---|---|---|---|---|---|
| $C_{12}H_6O_2Cl_2$: | | | | | |
| Calculated | 57.0 | 12.6 | 2.4 | 28.0 | 253 |
| Found | 57.1 | 12.6 | 2.4 | 28.2 | 247 |

EXAMPLE 2

1,2,3,4-tetrachloro-dibenzo-p-dioxine

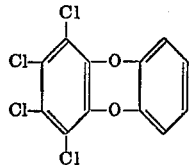

55.1 g. (0.5 mol) pyrocatechol and 64.1 g. (1 mol) of 87.5% by weight aqueous potassium hydroxide are dissolved under an inert gas in 500 ml. dimethyl sulphoxide. 142.4 g. (0.5 mol) hexachlorobenzene are subsequently added at 90° C., and the reaction mixture is heated at 140-150° C. for 6 hours. After cooling, the reaction product is precipitated in the form of a grey-white powder by pouring the mixture into water. It is collected in a suction filter, rinsed with a 3% by weight aqueous sodium hydroxide solution and then with water until the reaction is neutral, and dried. A crude yield of 128 g. is obtained.

For purification, the 1,2,3,4-tetrachloro-dibenzo-p-dioxine is recrystallized once from toluene or dioxan. Fine white crystal platelets of melting point 184-185° C. are obtained.

| Elementary analysis | C | H | O | Cl | Mol weight |
|---|---|---|---|---|---|
| $C_{12}H_4O_2Cl_4$: | | | | | |
| Calculated | 44.8 | 1.3 | 9.9 | 44.0 | 322.0 |
| Found | 44.7 | 1.3 | 9.7 | 43.9 | 317 |

EXAMPLE 3

6,13-dichloro-benzo-p-dioxino[2,3]dibenzo-p-dioxine

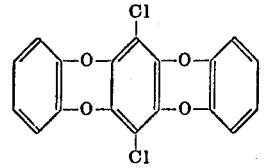

88.1 g. (0.8 mol) pyrocatechol and 102.6 g. (1.6 mol) of 87.5% by weight aqueous potassium hydroxide are dissolved in 900 ml. dimethyl sulphoxide while heating to 100° C. The mixture is cooled to 60° C. and 100 ml. dimethyl sulphoxide are then distilled off in a water jet vacuum by slowly heating to 80° C. To the salt solution which has thus been substantially dehydrated, 113.9 g. (0.4 mol) hexachlorobenzene are then added at 90° C., and the mixture is heated at 140°-150° for 12 hours. After cooling, the reaction product is precipitated in the form of a grey powder by pouring the mixture into water. It is collected in a suction filter, rinsed with a dilute sodium hydroxide solution and then with water until the reaction is neutral, and dried.

For purification, the crude product is recrystallized from dioxan. 101 g. of a fine white powder of melting point 271°-272° C. are obtained.

| Elementary analysis | C | H | O | Cl | Mol weight |
|---|---|---|---|---|---|
| $C_{18}H_8O_4Cl_2$: | | | | | |
| Calculated | 60.2 | 2.2 | 17.8 | 19.8 | 359.1 |
| Found | 60.0 | 2.2 | 17.8 | 19.9 | 348 |

What we claim is:
1. 2,3-dichloro-7'-phenyl-dibenzo-p-dioxine.
2. 2,3-dichloro-benzo-[5,6]-naphtho[2',3']-p-dioxine.

References Cited

UNITED STATES PATENTS 3,226,400  12/1965  Kaupp et al. _____ 260—340.3

OTHER REFERENCES

Gilman, et al., "Journ. Amer. Chem. Soc.," vol. 79 (1957), pp. 1439-41.

Cantrell, et al., "Chemical Abstracts," vol. 70, 1969, col. 51805u.

DONALD C. DAUS, Primary Examiner

J. H. TURNIPSEED, Assistant Examiner

U.S. Cl. X.R.

260—45.8 A